June 30, 1959     A. Y. DODGE     2,892,363
TRANSMISSION
Filed Feb. 14, 1955     2 Sheets-Sheet 2

INVENTOR:
Adiel Y. Dodge,
BY
Bair, Freeman & Molinare
ATTORNEYS.

United States Patent Office 2,892,363
Patented June 30, 1959

2,892,363

TRANSMISSION

Adiel Y. Dodge, Rockford, Ill.

Application February 14, 1955, Serial No. 487,911

11 Claims. (Cl. 74—677)

This invention relates to transmissions and more particularly to a combined hydro-kinetic and gear transmission of a type suitable for use on automotive vehicles.

One of the objects of the invention is to provide a transmission including a hydraulic torque converter of the type having two driven rotors or turbines in which the drive from the two rotors is combined differentially through a single set of gearing.

According to one feature, the gearing includes two sun gears connected respectively to the two driven rotors and meshing, one directly and the other through an idler gear, with planet pinions on a carrier which is connected to the load.

Another object is to provide a transmission in which the first differential gear set drives the input gear of a second gear set which is arranged to provide low and direct forward drive and reverse drive.

A further object is to provide a transmission in which clutch means are provided to connect an element of the first gear set to the driving shaft so that the driven shaft can turn the driving shaft through the second gear set and the clutch means for engine braking or for starting the engine by pushing.

According to one feature of the invention, the clutch means is a one way clutch directly connected between the driving shaft and one of the sun gears of the first gear set.

Figure 1:
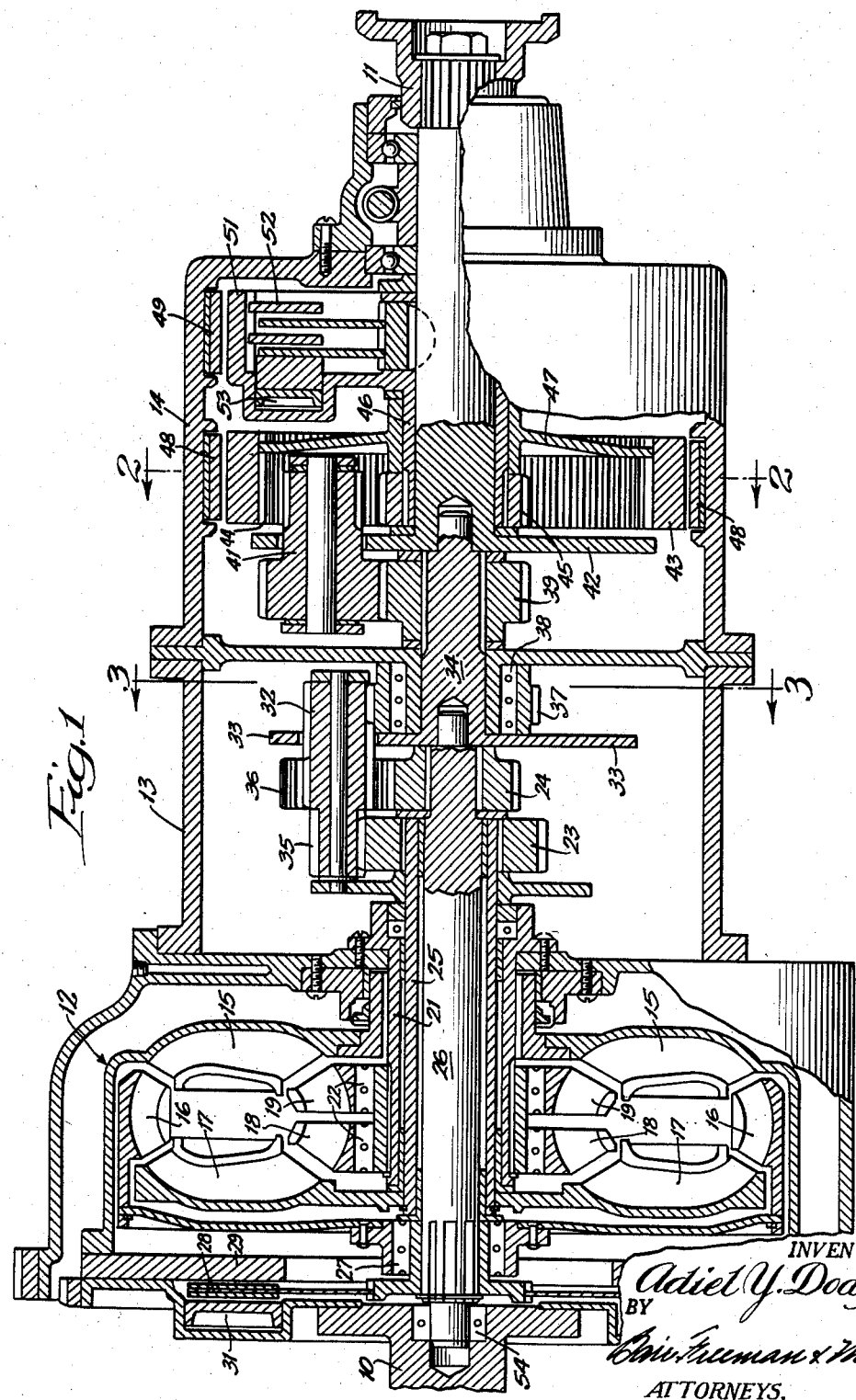
Figure 2:
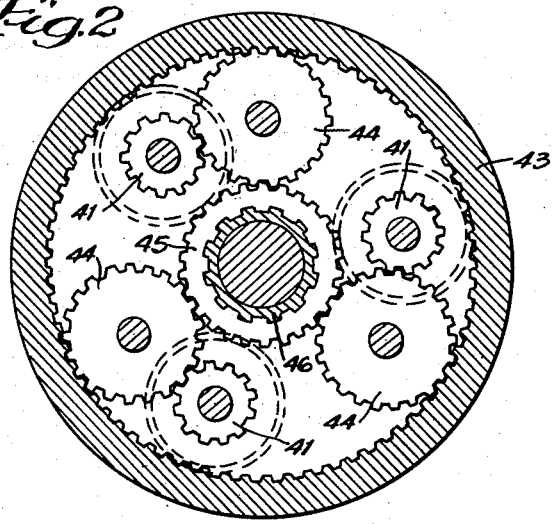
Figure 3:
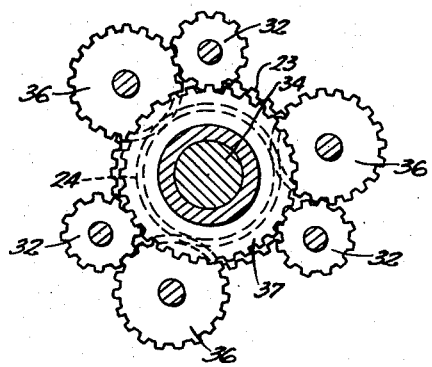

The above and other objects and features of the invention will be more readily apparent from the following description when read in connection with the accompanying drawings, in which:

Figure 1 is an axial section with parts in elevation of a transmission embodying the invention; and Figures 2 and 3 are partial sections on the lines 2—2 and 3—3, respectively, of Figure 1.

The transmission, as shown, is adapted to connect a driving shaft 10, which may be an engine crankshaft or an extension thereof, to a driven shaft 11, which may be connected through the usual differential to driving wheels of a vehicle. The driving shaft drives a hydraulic torque converter, indicated generally at 12, which drives through a first differential gear set enclosed in the casing 13 and through a second controllable gear set enclosed in the casing 14 which in turn drives the output or driven shaft 11.

The hydraulic torque converter 12, as shown, may be identical to that more particularly described and claimed in my co-pending application Serial No. 356,436, now Patent No. 2,820,373 filed May 21, 1953. As shown, the torque converter comprises a vaned impeller 15 directly connected to the driving shaft 10 to be driven thereby. Liquid discharge radially outward from the vaned impeller 15 passes in series through a first vaned rotor or turbine 16 and a second vaned rotor or turbine 17. From the discharge end of the second turbine 17 the liquid passes through a pair of stator rings 18 and 19 in series back to the inlet of the impeller. The stator rings 18 and 19 are mounted on a tubular extension 21 of the casing and are separately held against reverse rotation by one way brakes 22 engaging the respective stator rings and the extension 21.

The first differential gear set enclosed within the casing part 13 includes driving sun gears 23 and 24 of different diameters, as shown. Sun gear 23 is connected directly through a sleeve shaft 25 with the driven rotor 17 and the sun gear 24 is mounted on a shaft 26 extending through the sleeve shaft 25. The shaft 26 is connected through a one way clutch 27 to the first driven rotor 16 so that the rotor 16 can turn the shaft 26 forward so that the shaft can overrun the rotor 16. The shaft 26 also preferably carries a clutch plate 28 adapted to be forced into clutching engagement with a flange 29 on the driving casing structure by hydraulic pistons 31 directly to connect the shaft 26 and sun gear 24 to the driving shaft 10.

The sun gears 23 and 24 are adapted to mesh drivingly with elongated compound planet pinions 32 mounted on a gear carrier 33 which is secured to a shaft 34. The pinions 32 include small diameter end portions 35 which mesh directly with the larger driving pinion 23. The pinions 24 mesh with idler gears 36 which in turn mesh with the other end portions of the planet pinions 32.

In addition, to provide mechanical torque multiplication at the start a third sun gear 37 is preferably provided which is mounted on an extension of the casing through a one way brake 38 so that the sun gear 37 is held against reverse rotation, but is permitted to rotate forwardly.

The second gear set enclosed within the casing part 14 includes a driving sun gear 39 secured to the shaft 34 and meshing with one end of compound planet pinions 41 which are mounted on a carrier 42 secured to the driven shaft 11. The pinions 41 include a small diameter portion lying within an internal annular ring gear 43. Idler pinions 44 mesh with the pinions 41 and with the ring gear 43 and also may mesh with a sun gear 45 mounted on a sleeve 46 which is rotatable around the driven shaft and on which the ring gear 43 is supported by a web or flange 47.

To control the second gear set, a friction brake 48 is provided to engage the ring gear 43 and hold it stationary for reverse drive. For low gear forward drive a brake 49 is provided engageable with a flanged extension 51 on the sleeve 46 to hold the sun gear 45 against rotation. For direct forward drive a friction clutch 52 controlled by hydraulic pistons 53 is provided to connect the sun gear 45 directly to the driven shaft 11.

For normal forward driving operation, the brakes 48 and 49 are disengaged and the clutch 52 is engaged to connect the sun gear 45 directly to the driven shaft 11. Since the planet carrier 42 is carried by the driven shaft, the second gear set will be locked to rotate as a unit at the same speed and torque as the gear 39. Under these conditions, as the driving shaft starts to turn, liquid will be pumped out by the vaned impeller 15 to circulate over the rotors 16 and 17 and the stators 18 and 19. When the torque exerted on the first rotor 16 becomes sufficient to turn it, it will turn the shaft 26 and the sun gear 24 forward through the idlers 36 and pinions 32. This will tend to cause the carrier 33 to turn forward due to rolling of the pinions 32 around the reaction sun gear 37 so that the gear 39 and the driven shaft will be turned forward with the torque multiplication produced in the torque converter times the torque multiplication effected in the first gear set. For example, the torque converter may develop a torque of 2:1 and the mechanical gear set a torque multiplication of 1.7:1 giving an overall torque increase of 3.4:1.

During this operation, the rotor 17 is allowed to turn forward due to the fact that the sun gear 23 is larger than sun gear 24 so that smooth flow of liquid through the torque converter will occur and maximum efficiency will be achieved. As the engine speed increases and the load requirements decrease, the second rotor 17 will start turning forward faster than the rate permitted by the gearing ratio to turn the sun gear 23 forward. At this time, the clutch 38 overruns and the carrier 33 is driven jointly by the two rotors through the sun gears 23 and 24. During this operation differential speeds will exist between the two rotors and the forces exerted by the rotors will be balanced through the differential gear set to provide maximum operating efficiency.

As the speed increases further, and the torque requirements decrease, the first stator 18 will begin to overrun its one way brake 22 and eventually the second stator 19 will overrun its one way brake so that the hydraulic unit is operating substantially as a fluid coupling. Under substantially all operating conditions, however, the first rotor 16 will tend to turn faster than the second rotor 17 and this effect is desirable to minimize shock in the torque converter.

After the hydraulic torque converter has reached a substantially 1:1 torque and speed ratio, the mechanical clutch 28 may be engaged, if desired. When this is done, the sun gear 24 will be driven mechanically at the same speed as the drive shaft and the sun gear 23 will continue to be driven hydraulically by the rotor 17. The one way clutch 27 may overrun under these conditions to leave the first rotor 16 as an idler unit, although this one way clutch 27 could be omitted, if desired.

For still greater torque multiplication and lower speed drive, the clutch 52 may be disengaged and the brake 49 may be engaged to hold the sun gear 45 stationary. Under these conditions, rotation of the driving gear 39 will turn the planet pinions 41 which will in turn rotate the idler gears 44 and cause them to roll around the stationary sun gear 45. This will drive the carrier 42 forward at low speed and extremely high torque. The low forward gear thus produced will not be required for normal driving, but may be utilized to drive the vehicle under severe conditions or to produce maximum engine braking in descending grades, or the like.

For reverse, the clutch 52 and brake 49 are disengaged and the brake 48 is engaged to hold the ring gear 43 stationary. Under these conditions rotation of the driving gear 39 will turn the planet pinions 41 which will turn the idler pinions 44. The idler pinions 44 will roll around the stationary ring gear 43 to turn the carrier 42 and the driven shaft in a reverse direction at multiplied torque.

To facilitate engine braking in descending grades, or the like, and to provide for starting of the engine by pushing the vehicle, means are provided to connect one of the elements of the first gear set to the driving shaft. The clutch 28 can serve this purpose since when it is engaged its connects the sun gear 24 directly to the driving shaft to provide an efficient transmission of power backwards through the transmission from the driven shaft 11 to the driving shaft 10. To eliminate the necessity of engaging the clutch 28, which may be impossible in the absence of hydraulic operating pressure, a one way clutch 54 is provided acting directly between the shaft 26 and the driving shaft 10 to prevent the shaft 26 from turning forward faster than the driving shaft. Whenever the vehicle tends to overrun the engine due to coasting down a grade or to pushing the vehicle to start the engine, the clutch shaft 26 will tend to turn forward faster than the driving shaft and the one way clutch 54 will engage to prevent its operation. Use of the engine for braking may therefore be accomplished efficiently or the engine can be started easily by pushing the vehicle in the event of a dead battery.

While one embodiment of the invention has been shown and described herein, it will be understood that it is illustrative only and not to be taken as a definition of the scope of the invention, reference being had for this purpose to the appended claims.

What is claimed is:

1. A transmission comprising a hydraulic torque converter including a vaned driving impeller, a pair of vaned driven rotors, a vaned stator, and a one way brake to hold the stator against reverse rotation, and a planetary gear set including a carrier connected to a load, planet pinions on the carrier, a sun gear connected to one of the rotors and meshing with the planet pinions, a second sun gear connected to the other rotor, an idler gear meshing with the second sun gear and the planet pinions, a third sun gear meshing with the pinions, and a one way brake to hold the third sun gear against reverse rotation so that it acts as a fulcrum for mechanical torque multiplication.

2. A transmission comprising a hydraulic torque converter including a vaned driving impeller, a pair of vaned driven rotors, a vaned stator, and a one way brake to hold the stator against reverse rotation, and a planetary gear set including a carrier connected to a load, planet pinions on the carrier, a sun gear connected to one of the rotors and meshing with the planet pinions, a second sun gear, a one way clutch connecting the second sun gear to the other rotor, an idler gear meshing with the second sun gear and the planet pinions, the one way clutch allowing the second sun gear to overrun said second rotor and a clutch to connect the second sun gear directly to the impeller.

3. The construction of claim 1 in which the first two named sun gears are of different sizes than each other and than the third sun gear so that both of the rotors can turn forward when the third sun gear is held stationary.

4. A transmission comprising a hydraulic torque converter including a vaned driving impeller, a pair of vaned driven rotors, a vaned stator, and a one way brake to hold the stator against reverse rotation, and a planetary gear set including a carrier connected to a load, elongated compound planet pinions carried by the carrier parallel to and spaced from the axis of the torque converter and formed with spaced portions of different diameters, a pair of sun gears of different diameters drivably connected to the rotors respectively, one sun gear meshing directly with the planet pinions, and an idler gear meshing with the other sun gear and the planet pinions, a third sun gear meshing with the planet pinions, and a one way brake to hold the third sun gear against rotation in a reverse direction.

5. A transmission comprising a hydraulic torque converter including a vaned driving impeller, a pair of vaned driven rotors, a vaned stator, and a one way brake to hold the stator against reverse rotation, and a planetary gear set including a carrier connected to a load, planet pinions on the carrier, a sun gear connected to one of the rotors and meshing with the planet pinions, a second sun gear connected to the other rotor, an idler gear meshing with the second sun gear and the planet pinions, a one way clutch connecting one of the rotors to one of the sun gears, and a one way clutch connecting said one of the sun gears to the impeller to prevent the sun gear from overrunning the impeller.

6. A transmission for connecting a driving shaft to a driven shaft comprising a vaned impeller connected to the driving shaft, a pair of vaned driven rotors and a vaned stator in fluid circuit with the impeller, a one way brake to hold the stator against reverse rotation, a differential gear set having a driven element and two driving elements connected to the rotors respectively, a reaction element, and a one way brake to hold the reaction element against reverse rotation, the driving elements, driven element and reaction element being drivably interconnected through gearing in such a manner that when the driven element is held each of the driving elements tends to turn the other in a reverse direction a second gear set including a driving gear connected to the driven element to be driven thereby, a carrier connected to the driven shaft, planet pinions on the carrier meshing with the driving gear, a reaction gear meshing with the planet pinions to provide a fulcrum for torque multiplication, brake means to hold the reaction gear against rotation, and a clutch to connect two of the elements of the second gear set.

7. The construction of claim 6 including a clutch to connect the driving shaft to one of the driving elements of the differential gear set thereby to facilitate turning of the driving shaft by the driven shaft.

8. A transmission comprising a hydraulic torque converter including a driving impeller having a series of radially elongated vanes, a first driven rotor having a series of vanes adjacent the outer part of the impeller to receive fluid therefrom, a second driven rotor having a series of radially elongated vanes receiving fluid at their outer ends from the first rotor vanes, a vaned stator receiving fluid from the second rotor vanes and delivering the fluid to the impeller vanes, a one way brake to hold the stator against reverse rotation, and a differential gear set including a driven element and a pair of driving elements connected to the rotors respectively the driving elements, driven element and reaction element being drivably interconnected through gearing in such a way that when the driven element is held each of the driving elements tends to turn the other in a reverse direction.

9. A transmission comprising a hydraulic torque converter including a driving impeller having a series of radially elongated vanes, a first driven rotor having a series of vanes adjacent the outer part of the impeller to receive fluid therefrom, a second driven rotor having a series of radially elongated vanes receiving fluid at their outer ends from the first rotor vanes, a vaned stator receiving fluid from the second rotor vanes and delivering the fluid to the impeller vanes, a one way brake to hold the stator against reverse rotation, a differential gear set including a driven element and a pair of driving elements connected to the rotors respectively, a fourth reaction gear element in the gear set to provide a fulcrum for torque multiplication, and a one way brake to hold the reaction gear element against reverse rotation the driving elements, driven element and reaction element being drivably interconnected through gearing in such a way that when the driven element is held each of the driving elements tends to turn the other in a reverse direction.

10. A transmission comprising a hydraulic torque converter including a driving impeller having a series of radially elongated vanes, a first driven rotor having a series of vanes adjacent the outer part of the impeller to receive fluid therefrom, a second driven rotor having a series of radially elongated vanes receiving fluid at their outer ends from the first rotor vanes, a vaned stator receiving fluid from the second rotor vanes and delivering the fluid to the impeller vanes, a one way brake to hold the stator against reverse rotation, a differential gear set including a driven element and a pair of driving elements connected to the rotors respectively the driving elements and driven element being drivably interconnected through gearing in such a way that when the driven element is held each of the driving elements tends to turn the other in a reverse direction, and a clutch to connect the driving element which is connected to the first rotor directly to the impeller.

11. A transmission comprising a hydraulic torque converter including a driving impeller having a series of radially elongated vanes, a first driven rotor having a series of vanes adjacent the outer part of the impeller to receive fluid therefrom, a second driven rotor having a series of radially elongated vanes receiving fluid at their outer ends from the first rotor vanes, a vaned stator receiving fluid from the second rotor vanes and delivering the fluid to the impeller vanes, a one way brake to hold the stator against reverse rotation, a differential gear set including a driven element and a pair of driving elements connected to the rotors respectively the driving elements and driven element being drivably interconnected through gearing in such a way that when the driven element is held each of the driving elements tends to turn the other in a reverse direction, a second gear set including a driving gear connected to the driven element to be driven thereby, a carrier connected to the driven shaft, planet pinions on the carrier meshing with the driving gear, a reaction gear meshing with the planet pinions to provide a fulcrum for torque multiplication, brake means to hold the reaction gear against rotation, and a clutch to connect two of the elements of the second gear set.

References Cited in the file of this patent

UNITED STATES PATENTS

| | | |
|---|---|---|
| 782,547 | Coffee | Feb. 14, 1905 |
| 2,162,803 | England | June 20, 1939 |
| 2,334,402 | Flinn | Nov. 16, 1943 |
| 2,624,215 | McRae | Jan. 6, 1953 |
| 2,718,796 | Gautier | Sept. 27, 1955 |
| 2,763,163 | Seybold | Sept. 18, 1956 |
| 2,768,537 | Seybold | Oct. 30, 1956 |